R. E. JACKSON AND B. O. YEARWOOD.
LOCOMOTIVE STOKER.
APPLICATION FILED DEC. 2, 1920.

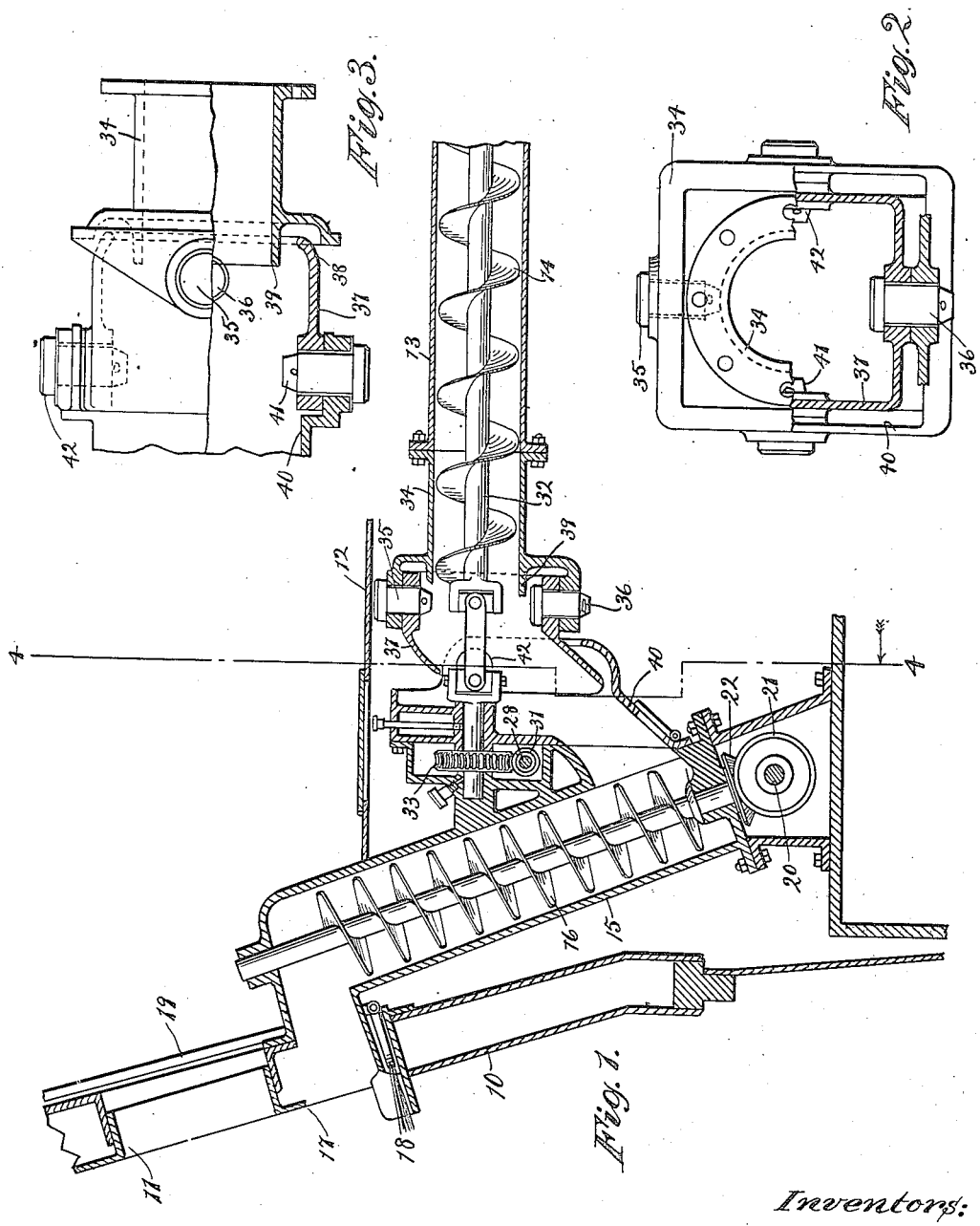

1,425,322.

Patented Aug. 8, 1922.
2 SHEETS—SHEET 2.

Inventors:
Robert E. Jackson
Byrd O. Yearwood
By

UNITED STATES PATENT OFFICE.

ROBERT E. JACKSON, OF PRINCETON, WEST VIRGINIA, AND BYRD O. YEARWOOD, OF TOCCOA, GEORGIA, ASSIGNORS TO LOCOMOTIVE STOKER COMPANY, A CORPORATION OF PENNSYLVANIA.

LOCOMOTIVE STOKER.

1,425,322.  Specification of Letters Patent.  Patented Aug. 8, 1922.

Application filed December 2, 1920. Serial No. 427,800.

*To all whom it may concern:*

Be it known that we, ROBERT E. JACKSON and BYRD O. YEARWOOD, citizens of the United States, and residents, respectively, of Princeton, county of Mercer, and State of West Virginia, and Toccoa, county of Stephens, State of Georgia, have jointly invented certain new and useful Improvements in Locomotive Stokers, of which the following is a specification, and which are illustrated in the accompanying drawings, forming a part thereof.

The invention relates to locomotive stokers, and has for an object the provision in such a device of an elevating conveyor of improved form.

An illustrative embodiment of the invention is shown in the accompanying drawings, in which—

Fig. 1 is a vertical longitudinal section on line 1—1 of Fig. 4;

Fig. 2 is an end view, partly in vertical section, of the joint for connecting the transfer and elevator conduits;

Fig. 3 is a plan view, partly in horizontal section, of the conduit joint;

Figure 4:
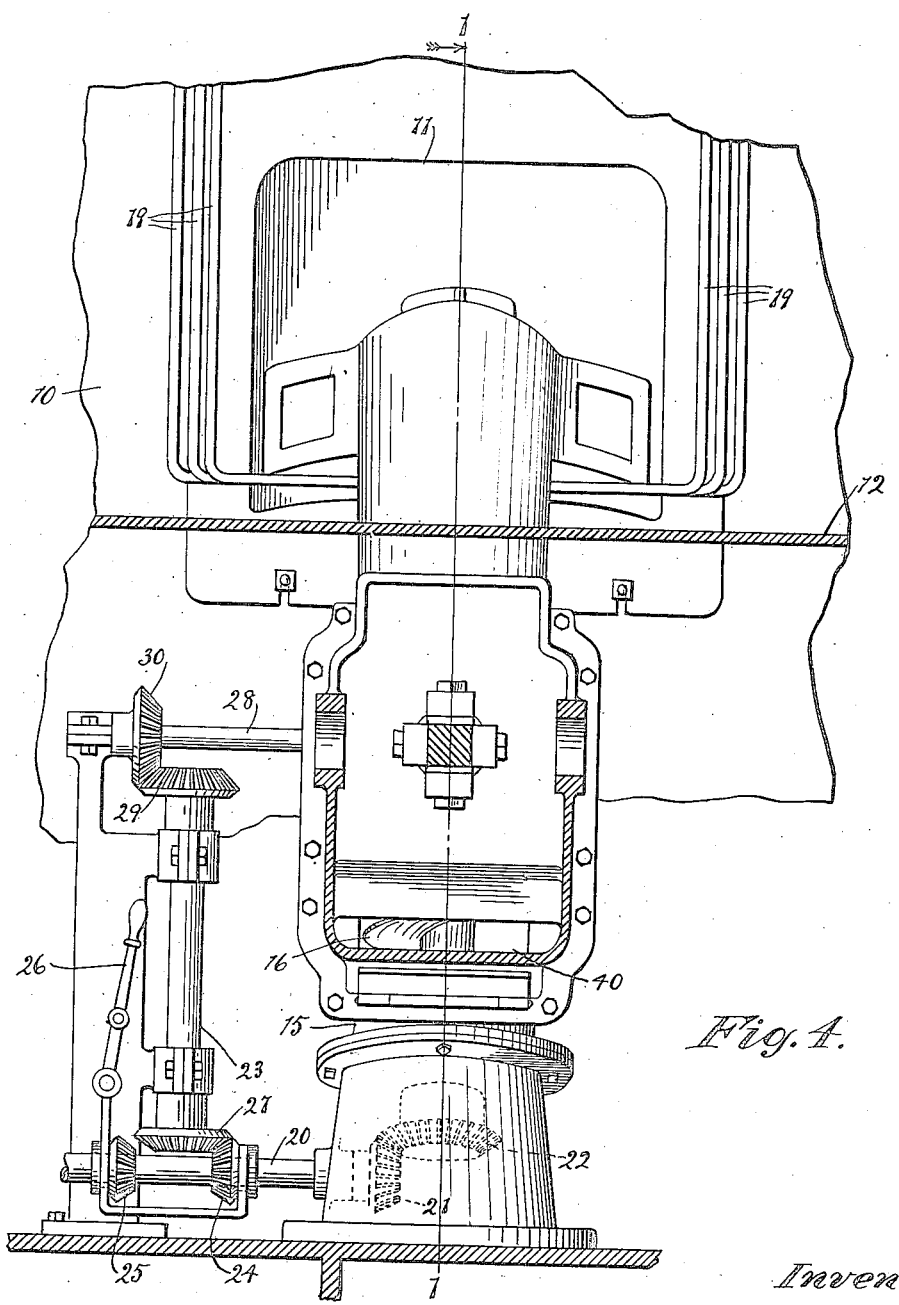
Fig. 4 is a vertical section on line 4—4 of Fig. 1.

The rear end of a locomotive fire-box is indicated at 10, a fire door at 11, and the deck of the cab at 12. For conveying coal from the tender (not shown) to the stoker the transfer conduit 13, running below the deck of the cab, is provided with a screw conveyor 14. The coal is delivered by the screw 14 to the elevating conveyor, comprising a conduit 15, housing a screw 16, which conveyor delivers to the fire-box through an opening 17 occupying the lower portion of the fire door opening.

To distribute the fuel over the fire bed a steam jet or jets 18, supplied by a pipe or pipes 19, may be utilized, which, forming no part of the present invention, are only indicated diagrammatically on the drawing.

The stoker is driven by a shaft 20 to which power may be applied in any desired manner. The elevating screw 16 is driven by a pair of bevel gears 21, 22, on the power shaft and the shaft of the elevating screw. To drive the transfer conveyor a vertical countershaft 23 is shown which may be driven in either direction by shiftable bevel gears 24, 25, shifted by a lever 26, and acting on a bevel gear 27 on the countershaft. The vertical countershaft drives a horizontal counter shaft 28 through bevel gears 29, 30. The horizontal countershaft 28 in turn drives the conveyor screw 14 by means of a worm gear 33 on the conveyor screw shaft 32, and a worm 31 on the horizontal countershaft 28.

To cause the fuel to become less compact as it is elevated, that the mass may be loose and readily scattered by the steam jets when delivered at the top of the elevating screw, the elevating conduit 15 is formed with an upwardly increasing diameter or with an inverted frustoconical shape.

Due to curves in the track and to vertical irregularities therein, it is desirable that the transfer conduit, one end of which must move with the tender, should have a substantially universal joint connection with the elevating conduit which is rigidly attached to the locomotive. To provide a novel form of joint for this purpose the forward end of the conduit 13 is preferably formed as a separate element 34, which is enlarged at its forward end and provided with openings for pintles 35, 26. A joint member 37 fits inside the enlargement, has openings for the pintles 35 and 36, and has a portion 38 which encloses an interior projection 39 of the element 34.

The intake 40 of the elevating conduit has openings for a pair of pintles 41, 42, at right angles to the pintles 35, 36, and the joint member 37 lies inside the opening of the intake member and has openings to receive the pintles 41, 42. The result is that the transfer conduit may move through a limited range in any angular direction. The transfer screw shaft 32 is shown as supplied with a universal joint substantially in the same vertical plane with each set of pintles 35, 36 and 41, 42.

We claim as our invention—

1. A locomotive stoker comprising, in combination, a fuel elevator comprising a conduit having upwardly diverging walls, an elevating member in said conduit, and means to scatter the loose fuel delivered by said elevator within a fire-box.

2. In a locomotive stoker, in combination, a fuel elevator comprising a conduit having upwardly diverging walls, an elevating screw in said conduit, means to feed fuel to said elevator, and means to inject the fuel delivered by said elevator into a fire-box.

3. In a locomotive stoker, in combination, a fuel elevator comprising a conduit having an upwardly increasing diameter, a screw having an upwardly increasing diameter working in said conduit whereby fuel will become looser as it is elevated, means to feed fuel to said elevator, and means to inject the loose fuel delivered by said elevator into a fire-box.

4. In a locomotive stoker, in combination, a fuel elevator comprising a conduit, elevating means within the conduit the carrying capacity of said elevating means being greater at its upper than at its lower end, whereby fuel will become looser as it is elevated, and means for injecting the loose fuel delivered by said elevator into a fire-box.

ROBERT E. JACKSON.
BYRD O. YEARWOOD.